Aug. 28, 1956

A. V. HAEFF 2,761,089

HALF-TONE STORAGE TUBES

Filed Jan. 3, 1952

7 Sheets-Sheet 1

INVENTOR.
ANDREW V. HAEFF,
BY Nicholas T Volk
ATTORNEY.

INVENTOR.
ANDREW V. HAEFF,
BY Nicholas T. Volsk
ATTORNEY.

Aug. 28, 1956 A. V. HAEFF 2,761,089

HALF-TONE STORAGE TUBES

Filed Jan. 3, 1952 7 Sheets-Sheet 3

INVENTOR.
ANDREW V. HAEFF,
BY Nicholas T Volk
ATTORNEY.

INVENTOR.
ANDREW V. HAEFF,
BY Nicholas T Volsk
ATTORNEY.

Aug. 28, 1956 A. V. HAEFF 2,761,089

HALF-TONE STORAGE TUBES

Filed Jan. 3, 1952 7 Sheets-Sheet 5

INVENTOR.
ANDREW V. HAEFF,
BY Nicholas T Volsk
ATTORNEY.

INVENTOR.
ANDREW V. HAEFF,
BY Nicholas T. Volsk
ATTORNEY.

Aug. 28, 1956 A. V. HAEFF 2,761,089

HALF-TONE STORAGE TUBES

Filed Jan. 3, 1952 7 Sheets-Sheet 7

INVENTOR.
ANDREW V. HAEFF,
BY Nicholas T Volsk
ATTORNEY.

United States Patent Office 2,761,089

Patented Aug. 28, 1956

2,761,089

HALF-TONE STORAGE TUBES

Andrew V. Haeff, Pacific Palisades, Calif., assignor, by mesne assignments, to Hughes Aircraft Company, a corporation of Delaware Application January 3, 1952, Serial No. 264,743

7 Claims. (Cl. 315—12)

This invention relates to electron discharge devices, and more particularly to that type of electron discharge devices in which received intelligence signals are utilized for producing corresponding stored electrostatic charges, these charges being used for repeating the received signals once or many times as an outgoing electrical signal or for reproducing the received signals as visual images.

In the storage tubes of the present invention, the incoming signals are used to modulate a "writing" electron beam. Depending upon the energy and density of this writing electron beam which is caused to impinge on a storage screen, smaller or larger numbers of electrons are deposited on the storage screen resulting in an electrostatic charge distribution being disposed on the storage surface of the screen. On the side of the storage screen away from the writing beam there is mounted a plurality of elements which are connected to appropriate sources of potential for producing an electrostatic field that penetrates the interstices of the storage screen. This storage screen is exposed to a collimated flow of flood electrons with the result that some of the slow secondary electrons emitted from the storage surface by the impinging flood electrons are attracted through the interstices of the storage screen. The charge distribution on the storage surface determines the degree of influence exerted by the electrostatic field penetrating the interstices of the storage screen and thus controls the relative number of secondary electrons penetrating the storage screen. Thus, the charges created on the storage surface by the modulated writing beam, operate in a manner analogous to a control grid on the slow secondary electrons.

In the storage tubes of the present invention, these secondary electrons are utilized to produce a useful output signal. This output signal may be in the form of an output electrical signal corresponding to the input signal and delayed by a desired length of time, or it may take the form of a substantially continuous visual image, such as a television picture or a radar display, these visual images being reproduced either in black and white or in color. In the storage tube of the present invention, the flood electrons may also function to perpetuate the signal produced by the writing gun on the storage screen.

The particular advantages of the disclosed invention over the prior art are the achievement of visual presentation having a dynamic range of intensities and controllable persistence in accordance with a video signal all accomplished by the use of electrostatic storage techniques in a single tube and the production at any arbitrary later time of an electrical signal having the same amplitude variations as the original signal stored.

It is, therefore, an object of this invention to provide a direct-viewing storage tube with dynamic range of intensities and controllable persistence.

A further object of this invention is to provide a direct-viewing color storage tube with dynamic range of intensities and controllable persistence.

A still further object of this invention is to provide a direct-viewing storage tube having dynamic range of intensities and having means to furnish an electrical output representative of the stored information.

An additional object of this invention is to provide a direct-viewing color storage tube with dynamic range of intensities and having persistence such that each color field will appear continuously and simultaneously.

It is an additional object of this invention to provide a storage tube having a writing gun, a holding gun, a reading gun, a storage screen, a viewing screen, a contrast control grid and a collector electrode, all of the above elements being mounted in a single evacuated envelope and capable of producing the visual image on the viewing-screen which corresponds to the signals impressed on the intensity grid of the writing gun, said image having a dynamic range of intensities and controllable persistence.

It is a further object to provide a storage tube having a writing gun with electron beam deflecting means, a holding gun, a collector grid, a storage screen and a viewing-screen all enclosed within a glass envelope, said tube being capable of producing an image having controllable persistence, brightness and presentation in "black and white" or in color.

A still further object is to provide a storage tube having a writing gun, a holding gun, a reading gun, a storage screen and a collector grid all enclosed within a glass envelope whereby information, in accordance with a signal, can be stored for an indefinite length of time and then reproduced at a later time by scanning with the reading beam.

The novel features which are believed to be characteristic of the invention, both as to its organization and method of operation, together with further objects and advantages thereof, will be better understood from the following description considered in connection with the accompanying drawings, in which several embodiments of the invention are illustrated by way of example. It is to be expressly understood, however, that the drawings are for the purpose of illustration and description only, and are not intended as a definition of the limits of the invention.

Figure 1:
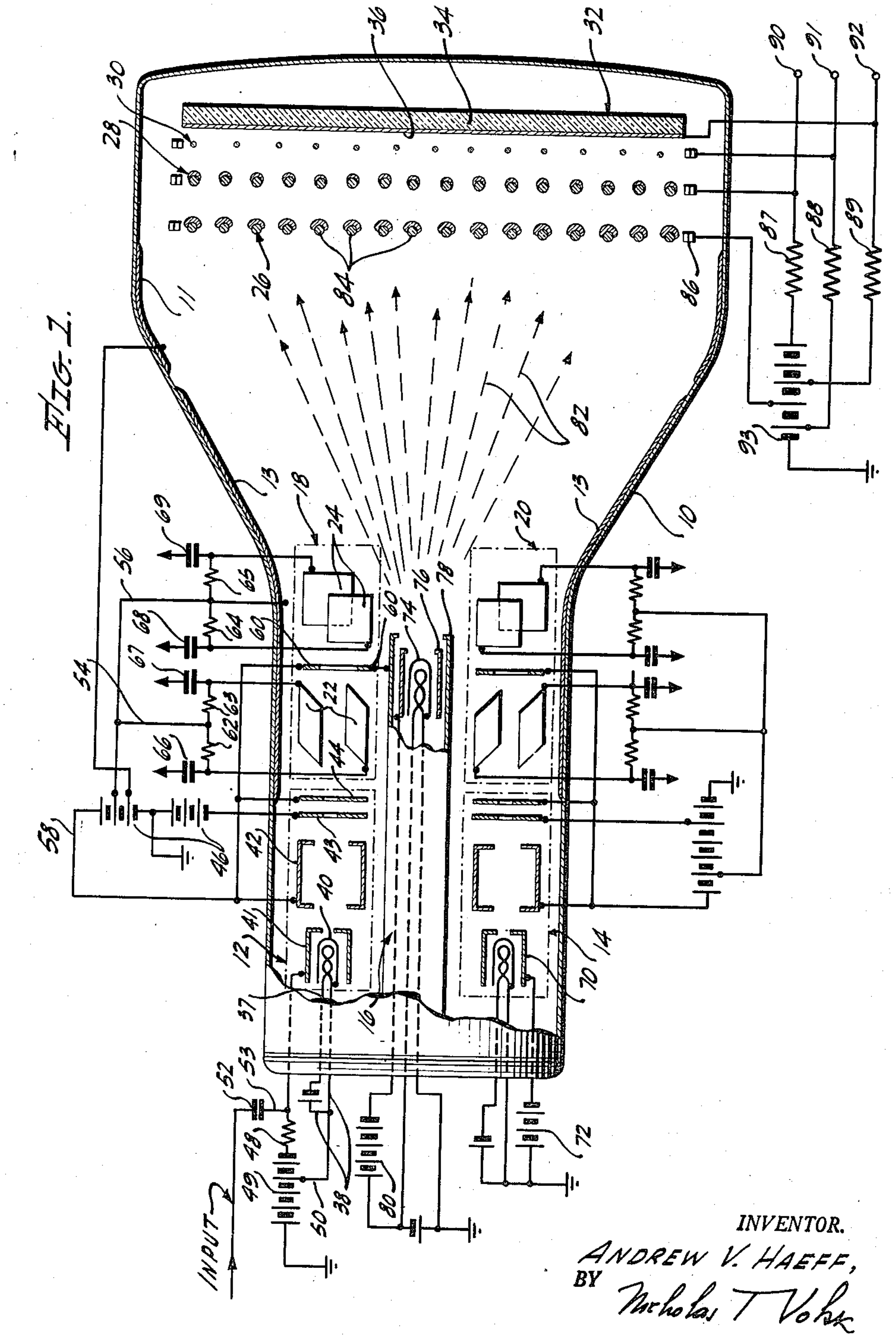
Fig. 1 illustrates a sectional schematic of a direct-viewing storage tube with dynamic range.

Referring to Figs. 1, it illustrates a sectional view of one embodiment of the disclosed storage tube, which, depending upon its mode of operation, will produce a visible image of either black and white or color variety, with a persistence controllable over a range from a fraction of a millisecond to any arbitrary interval of time in accordance with an electrical input signal. The disclosed storage tube is particularly adaptable to radar or television in that the visual image created during one frame may be held until the next one is received, eliminating, for all practical purposes, the problem of flicker. In addition, the disclosed tube has a dynamic range of intensities suitable for picture reproduction, and can also be used for producing an electrical output signal in accordance with stored information, making the tube suitable for repeating the received signal after a delay time of any desired length.

The particular embodiment of direct-viewing storage tube shown in Fig. 1 comprises an evacuated envelope 10 with three electron guns located in its left portion, as viewed in Fig. 1. These electron guns are a writing gun 12, a reading gun 14, and a holding gun 16. Located in the right hand portion of evacuated envelope 10, as viewed in Fig. 1 are the storage screen 26, viewing screen 28, contrast control grid 30 and collector electrode 32. Writing gun 12 and reading gun 14 are similar in construction and, therefore, only the description of one gun is necessary.

The writing gun 12 consists of a conventional heater element 37 connected, by means of conductors 38, to a source of filament potential, a button-type cathode 40, an intensity grid 41, and beam forming and accelerating electrodes 42, 43 and 44. The accelerating electrode 42 is connected to the positive terminal of a source of direct potential 46 which holds this electrode at some suitable potential positive with respect to cathode 40 which may be on the order of 1500 volts. The electrode 44 is also connected to the source 46 so as to apply the same positive potential thereto, while electrode 43 is connected to the negative terminal of source 46, maintaining this electrode on the order of 300 volts positive with respect to the potential of cathode 40. The intensity grid 41 of the gun is connected through a high resistance 48 to a biasing source of potential 49 which holds the grid at some suitable negative potential with respect to cathode 40, the value of this bias being of the order of −50 volts with respect to cathode 40. An input signal normally is impressed on the intensity grid circuit through a capacitor 52 and a conductor 53. Cathode 40 is also connected to a source of biasing potential 49 through a conductor 50, at some suitable point, so that the cathode is at approximately −600 volts with respect to ground. The operation and construction of the electron gun structures of the above type are known in the art and, therefore, need no additional description.

The writing gun 12 has electron beam deflecting means 18 comprising vertical deflection plates 22 and horizontal deflection plates 24 which are shielded from each other by an electrode 60. While electrostatic deflecting means are illustrated in this figure, it is to be understood that magnetic deflection coils may also be used, in which case the horizontal and vertical deflection plates are replaced with appropriate shielded magnetic deflection coils. Direct-current potential is applied to vertical and horizontal deflection plates through conductors 54, 56 and isolating resistors 62, 63, 64 and 65, respectively, with the result that the plates are held at some suitable positive potential which may be of the order of 1400 volts. Capacitors 66, 67, 68 and 69 are utilized for impressing balanced saw-tooth wave scanning voltages across the deflection plates, the circuitry for which is not illustrated in the figure. The disclosed tube is in no way restricted to a particular mode of scanning and since suitable scanning circuits are known in the art, there is no need for description.

The structure of the reading gun 14 is similar to that of the writing gun 12, but the mode of operation is different. The cathode of the reading gun 14 is connected to ground and the intensity grid 70 is connected to a biasing source of potential 72, which maintains the intensity grid negative with respect to the cathode by an appropriate negative biasing potential which may be of the order of −50 volts. Other potentials are approximately the same as for writing gun 12 when taken with respect to the respective cathodes.

The holding gun 16 comprises a cathode 74, a beam-forming electrode 76, and an accelerating electrode 78, the latter extending over electrode 76 to shield the entire holding gun from the adjacent writing and reading guns. Electrode 78 is connected to the positive terminal of the source of potential 46 which holds it at the same potential as the potential of the electrode 42 in the writing gun. The beam-forming electrode 76 is connected to a negative source of potential 80 which negatively biases it with respect to cathode 74; this biasing may be of the order of −5 volts. The configurations of the electrodes 76 and 78, and especially the diameter of the openings in these electrodes, are such that a diverging electron beam 82 is produced by this gun. The electron optics of the holding gun should be such as to produce reasonably uniform density of the primary electrons in the plane of the storage screen 26 toward which this "flood beam" is directed.

Electrodes 11 and 13 are conductive coatings on the inside of glass envelope 10 and are maintained at suitable positive potentials from source 46. Their function is to provide the desired potential gradients in the region between the guns and the screen assembly.

Proceeding now with the description of the structure illustrated in the right portion of the tube, there are the storage screen 26, the viewing screen 28, the contrast control grid 30, and the collector electrode 32. The collector electrode 32 comprises a glass plate 34 and a conductive transparent layer 36 deposited on the side of plate 34 facing the electron guns. Transparent conductive layers of such type are known in the art by various names, one of them being known as "NESA," which consists of an evaporated layer of stannous chloride. The methods of depositing such layers are known to the prior art obviating further description.

Figure 2:
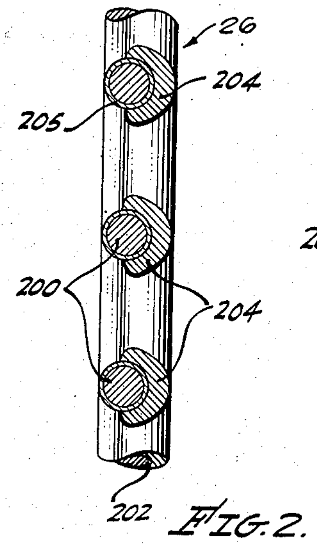
Fig. 2 is an enlarged cross-sectional view of the storage screen for the tube illustrated in Fig. 1.
Figure 3:
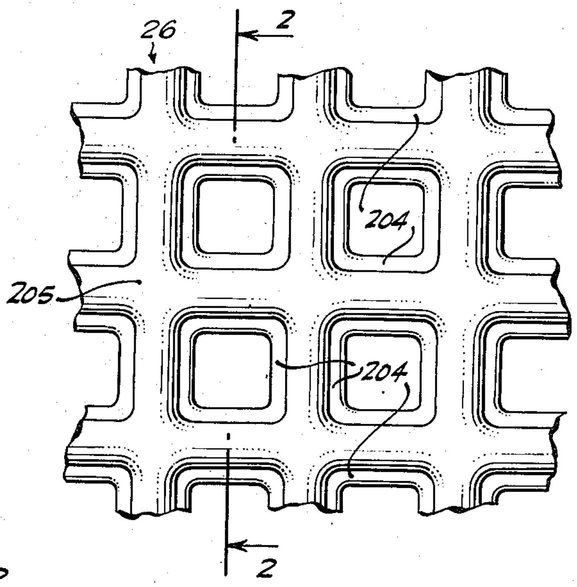
Fig. 3 is an enlarged front view of a portion of the storage screen exposed to the electron guns for the tube illustrated in Fig. 1.
Figure 4:
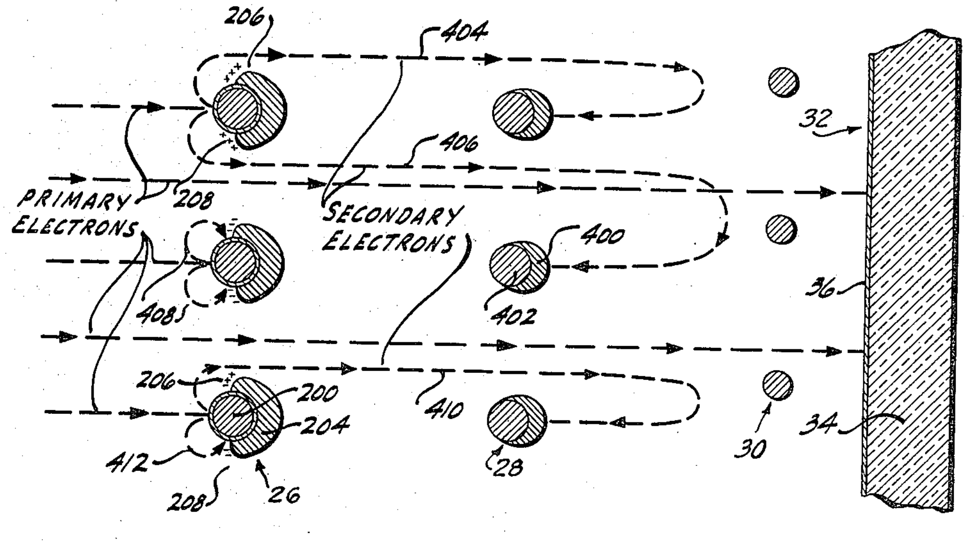
Fig. 4 is an enlarged functional diagram of the storage screen, viewing-screen, contrast control grid, and collector electrode for the tube illustrated in Fig. 1.

The storage screen 26 consists of a wire mesh 84, a portion of which is illustrated on a large scale in Figs. 2, 3 and 4. This screen, as illustrated more fully in the cross-sectional view in Fig. 2, consists of a flattened-out, fine mesh, metallic screen. One of the suitable materials for making such screens is stainless steel. Stainless steel offers several advantages, such as resistance to corrosion during the degassing process of the tube, and also has sufficient strength to retain its flat configuration when it is stretched between a hoop ring 86, Fig. 1, which is used for supporting the screen. Moreover, stainless steel also acts in itself as a fairly good emitter of secondary electrons when subjected to bombardment by the primary electrons. Other metals or alloys, possessing the above properties, can be used for making storage screen 26, one of them being nickel.

The size of the mesh of storage screen 26 may be of the order of 250 mesh per inch, with the diameter of the wire being of the order of 1½ or 2 mills. The limits of the number of wires per inch and the diameter of the wire used for making the screen are not especially critical. In the case that the mesh consists of horizontal wires 200 and vertical wires 202 it is subjected to a flattening-out process in a hydraulic press prior to its additional processing which is described below. Sufficient pressure is exerted by the hydraulic press to compress the crossover wire junctions so that the center lines of the vertical and horizontal wires 202, 200 are in substantially the same plane, as illustrated in Fig. 2.

After the mesh is flattened out in the above manner, its functioning can be improved by coating it with a good secondary emitter 205, the process of coating depending upon the sceondary emitter material used. Generally, such coating consists of evaporating in vacuum some suitable pure metal onto the surface of the mesh, such as silver, magnesium or aluminum. The next step in processing the screen consists of coating one side of the screen with a dielectric material 204 which has a very high specific resistance. Suitable dielectric materials for this purpose are such dielectrics as phosphors, especially P1, (cubic-$Zn_2SiO_4$:Mn), or P11, (cubic-ZnS:Ag), type phosphors.

The process of coating wire mesh 84 with the dielectric consists of directing or blowing a high velocity stream of clean air through the wire mesh, and, at the very same time, spraying it with an emulsion of phosphor suspended together with a binder in a liquid such as butyl acetate. A suitable binder is, for example, nitrocellulose. An airgun, held in direct proximity of the screen, is used for this purpose. The dielectric 204 is deposited by holding the spray gun so as to make the particles of the dielectric follow the free stream of air which makes them travel in the direction normal to the screen. This, as a rule, produces a dielectric layer having a configuration illustrated at 400, Fig. 4, deposited on a wire mesh 402, which constitutes the viewing screen 28, illustrated in Fig. 1. The shape of layer 400, when combined with the cylindrical shape of the wire, produces a locus resembling, in cross-section, a semi-ellipse on the dielectric side.

To produce the dielectric layer 204, which surrounds slightly more than half of the wire 200 of the storage screen 26, and forms surfaces 206 and 208, which are almost in the plane of the storage screen 26, facing all the guns, it becomes necessary to spray the wire mesh at an angle to make the dielectric spray penetrate, at least in part, through the screen and become deposited on the inner surface of the screen. After the dielectric is deposited on the screen, the part which should remain free of any dielectric particles is cleaned with a brush. Since the diameter of the brush bristles is greater than the diameter of the screen openings, the bristles do not penetrate the screen openings, but slide over that part of the screen which is illustrated as being free of phosphor in Figs. 2 and 4; this portion constitutes substantially a semicircle when viewed in cross-section.

The front plan view of the screen is illustrated in Fig. 3. The visible portions of the screen are the secondary emitter layer 205, which is exposed to the action of the writing, reading and holding guns, and those portions of the phosphor which correspond to the surfaces 206 and 208, illustrated in their cross-sectional views in Figs. 2 and 4. The overall transparency of the screen is not critical and may vary between wide limits, such as 20% to 70% transparency. It is to be noted here that the higher the potential impressed on viewing screen 28, the lower can be the transparency of storage screen 26. As will be explained more fully in connection with the description of the functioning of the tube, the positive electrostatic field, created by the high potential impressed on screen 28, must penetrate sufficiently through screen 26 so that the secondary electrons produced by the secondary emitter layer 205, as well as the secondaries produced by the dielectric surfaces 206 and 208, are attracted to the phosphor layer 400, and travel along paths 404, 406, etc., indicated by dotted lines in Fig. 4.

After depositing a layer of dielectric of the thickness illustrated in Figs. 2 and 4, the screen is subjected to a baking process in an oven which binds the phosphor more closely to the screen. The final configuration of the screen is then of the type illustrated in Figs. 2, 3 and 4.

While Figs. 2 and 3 illustrate the screen which is composed of horizontal and vertical wires 200 and 202, respectively, it is to be understood that the vertical wires 202 may be eliminated altogether provided the mechanical strength of the horizontal wires, in spite of their small size, is such as to retain their configuration without the assistance of the vertical wires. The disadvantage of such grating is that it does not possess as much strength as the wire mesh, and is too brittle for applications where long life and high resistance to shock are required. It may be stated also that such mesh will produce even better results from a purely electronic point of view than the mesh consisting of the vertical and horizontal wires so long as it is capable of retaining its proper shape.

Since storage screen 26, during one portion of its functional cycle acts as a capacitor for holding a predetermined positive or negative charge on any given small area of the dielectric portions 206 and 208, having a magnitude and sign that is a function of the intensity, density and the period of bombardment of the area by the electron beam, the dielectric layer 204 should have a very high specific resistance to hold the created charge on its surface without its leaking off to the metal mesh 84. Hence the reason for using such material as phosphor P1 or P11 as a dielectric medium. The function performed by viewing screen 28 is to attract the secondary electrons to the phosphor layer 400 where the kinetic energy of the electrons is converted into light energy of any desired wavelength, depending upon the type of phosphor selected for screen 28. From the above, it follows that the functions performed by the two layers, 204 and 400 are different, and, therefore, suitable phosphors for screen 28 are of the type which will produce light images of the desired color. Suitable phosphors to provide black and white or color reproductions are well known to the art. When complete color reproduction is desired, three basic colors such as red, blue and green are deposited in stripes in a horizontal direction (if horizontal scanning is used) with a stripe sequence consistent with the scanning system used. Since the diameter of the writing and reading electron beams is adjusted to cover a number of meshes, such as five to twenty, the horizontal stripes of the respective phosphors should cover a corresponding number of horizontal wires 402. Depositing of the full color-reproducing phosphor stripes on screen 28 may be accomplished by placing a slitted mask over the screen 28 with the slits corresponding to the desired stripes for one color of phosphor. The phosphor emulsion is then sprayed on and allowed to dry. The mask is then shifted a distance of one stripe and the spraying process repeated for the next color. A third colored stripe may be applied in the same manner, if desired.

The transparency of screen 28 is of the same order as the transparency of screen 26, i. e., preferably of the order of 40% to 60%. As mentioned previously, the transparency of screen 26 is primarily governed by the penetration of the openings in screen 26 by the electrostatic field created by screen 28 when the latter is connected to the positive side of a source of potential of the order of 1,000 to 10,000 volts. The transparency of screen 28, which is the viewing screen, depends on the resolution of the visual image desired and is improved by having the highest obtainable mesh count. However, the number of wires per inch cannot be increased indefinitely since the transparency of the screen, at the same time, should be sufficiently high so as to permit secondary electrons to reach the phosphor layer 400 on the viewing screen 28 for the primary electrons to reach the conductive layer 36. Accordingly, the final selection of the transparency, the diameter of the horizontal and vertical wires 402 and the spacing between the wires is a compromise between the desired high resolution and the desired transparency of the screen to the above-mentioned electron streams. Generally, the transparency, as well as the size of the mesh of viewing screen 28, is substantially the same as that of screen 26, i. e., 250 wires per inch, the diameter of the wire being of the order of 1½ or 2 mills. The method of depositing the phosphor layer 400 has been described already in connection wtih the description of the same method for depositing the dielectric layer 204 on wire mesh. The function performed by the screen will be discussed more in detail in connection with the description of the function of the tube.

The contrast control grid 30, as will be explained later, performs two distinct functions. The primary function is to repel the secondary electrons emitted by the secondary emitter layer 205 and the secondaries emitted by the dielectric 204 back toward the phosphor coating 400, and to allow the primary stream of electrons to go through the grid toward the conductive layer 36 of collector electrode 32. This is accomplished by impressing proper potentials with respect to each other and with respect to cathode 40, on the storage screen 26, viewing screen 28, contrast control grid 30 and collector 32, as will be pointed out below. The above functions of the contrast control grid 30 can be performed successfully with its transparency varying over a relatively wide limit. Grid 30 may comprise a fine metallic mesh made of metal, such as nickel, or glass mesh coated with a transparent conducting material such as "NESA."

The connections of the screens 26, 28, grid 30 and collector electrode 32 are as illustrated in Fig. 1. The viewing screen 28 is connected through a resistor 87 to the positive terminal of a source of direct potential 93, the negative terminal of which is grounded. Suitable positive operating potential for screen 28 is of the order of 3,000 to 10,000 volts to ground. The magnitude of this potential is selected, as previously mentioned, to produce a sufficiently strong electrostatic field through the mesh of screen 26, so as to attract the secondary electrons emitted by the secondary electron emitter 205 and dielectric material 204. Screen 26 is connected to the source 93 and its potential is made of the order of +200 volts with respect to ground. This potential will be determined primarily by the desired persistence of the visual image produced on the viewing screen 28 as explained more fully later in the specification. The contrast control grid 30 is also connected to the source of potential 93 through a resistance 88, its potential being of the order of +100 volts to ground. This potential should be negative with respect to the potential of screen 26 so as to make the secondary electron paths 404 and 406 such that the secondaries return to screen 28. Therefore, the primary function of this contrast control grid, as well as the magnitude of the potential impressed upon it, is such as to repel the secondary electrons back towards the phosphor layer 400 on screen 28. Since the relative number of the secondary electrons reaching screen 28 as compared with primary electrons determine the contrast of the image produced on screen 28, the potential impressed on grid 30 may be used to control the contrast of the image. Therefore, grid 30 constitutes the contrast control grid. The conductive coating 36 deposited on the glass plate 34 is connected to the source of potential through a resistance 89, and its potential is made of the order of 300 volts, or sufficiently higher than the potential of grid 30, so as to attract all the primary electrons produced by the holding gun 16. The spacing between the elements 26, 28, 30 and 32 is not critical. As it has already been mentioned previously, the spacing between the screens 26 and 28 is selected so that the field produced by screen 28 will penetrate the openings in screen 26 when the potential on screen 28 is somewhere between 1000 to 10,000 volts. The spacing between screen 28 and grid 30 is made as small as possible so as to produce high resolution without, at the same time, producing field emission from grid 30 because of its proximity to screen 28, which is at relatively high potential with respect to grid 30. The spacing between the control grid 30 and conductive coating 36 may have relatively wide limits and all that is required of grid 30 is that it produce an equipotential plane at a higher potential than that of the cathodes of the electron guns so as to pass all primary electrons on to collector electrode 32.

Figure 7:
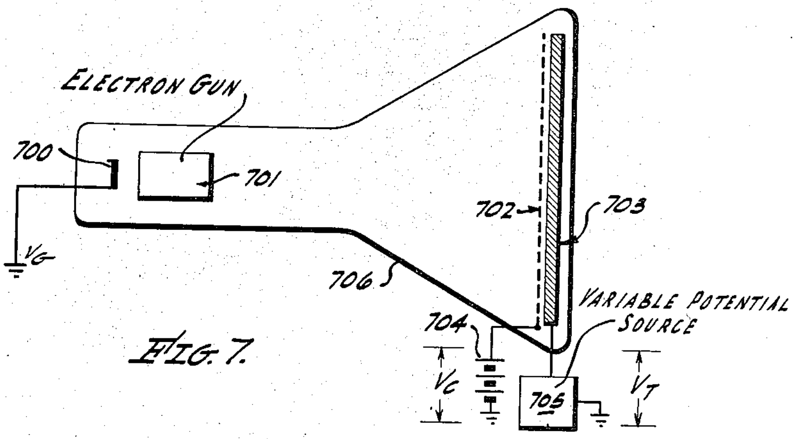
Fig. 7 is a schematic of a tube to illustrate the general properties of dielectrics.

Before proceeding with the description of the function of the tube illustrated in Fig. 1, it would be helpful to review briefly the physical phenomenon relating to the secondary electron emission characteristics of various dielectric surfaces such as phosphors. Referring to Fig. 7, which is only an explanatory figure, it illustrates an electron gun 701 with a cathode 700 and a collector grid 702 in front of a dielectric screen 103, all mounted within an evacuated envelope 706. For the purpose of explanation, it will be specified that dielectric screen 703 will have a finite conductivity. Cathode 700 is at ground potential, collector electrode 702 is maintained at positive potential, $V_c$, with respect to ground by means of a potential source 704, and dielectric screen 703 is maintained at a positive variable potential, $V_T$ with respect to ground by means of a variable potential source 705.

Figure 8A:
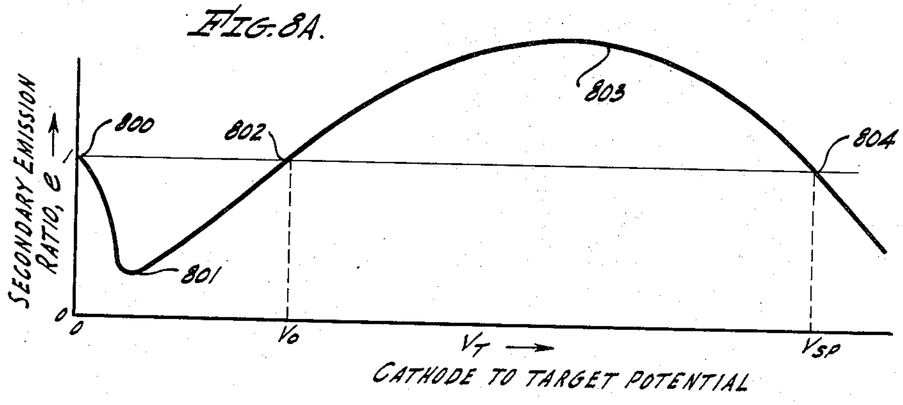
Fig. 8A is a characteristic curve of secondary emission ratio *e*, versus cathode-to-target potential, $V_T$, for the case when the potential $V_c$ of the collector grid is more positive than the most positive potential reached by the dielectric target.

Fig. 8A illustrates a secondary electron emission curve for the tube illustrated in Fig. 7 when all secondary electrons are collected. This curve is a plot of the secondary emission ratio, *e*, versus the potential difference $(V_T - V_G)$, where, as before, $V_T$ is the potential assumed by dielectric screen 703, and $V_G$ is the cathode potential. Since, in this case, $V_G=0$, the curve represents the secondary emission ratio plotted against the potential of dielectric screen 703. The secondary emission ratio *e* is defined as the ratio of the number of effective secondary electrons to the number of primary electrons incident upon the dielectric surface 703. Effective secondary emission electrons are defined as true secondary electrons plus primary electrons reflected or repelled or turned back from dielectric surface 703, all of which are attracted to the collector grid 702.

Referring to Fig. 8A, at point 800 corresponding to $V_T=0$, all primary electrons are turned back to collector grid 702 to become effective secondary electrons, making *e* equal to one. As $V_T$ increases in the positive direction from this point, increasing numbers of primary electrons are picked up by the dielectric screen 703 until a minimum number of primary electrons are turned back to grid 702, and the secondary emission ratio, *e*, is a minimum as indicated by point 801. As potential $V_T$ becomes greater than the potential corresponding to point 801, true secondary emission commences, increasing *e* until, finally, at point 802, the number of effective secondary electrons is equal to the number of incident primary electrons, and the secondary emission ratio $e$ is again equal to one. This potential, corresponding to the potential at point 802, is referred to as the "critical" potential, $V_o$. Increasing $V_T$ still further than $V_o$ will produce a maximum secondary emission ratio at point 803. A still further increase of $V_T$ will produce a decrease in the ratio because the incident primary electrons penetrate so deep into the dielectric material that the prospective secondary electrons no longer have an unobstructed path to the surface. A sufficient increase of $V_T$ will eventually reduce the secondary emission ratio, $e$, until it is again equal to one. This potential, corresponding to point 804, is referred to as the "sticking" potential.

Figure 8B:
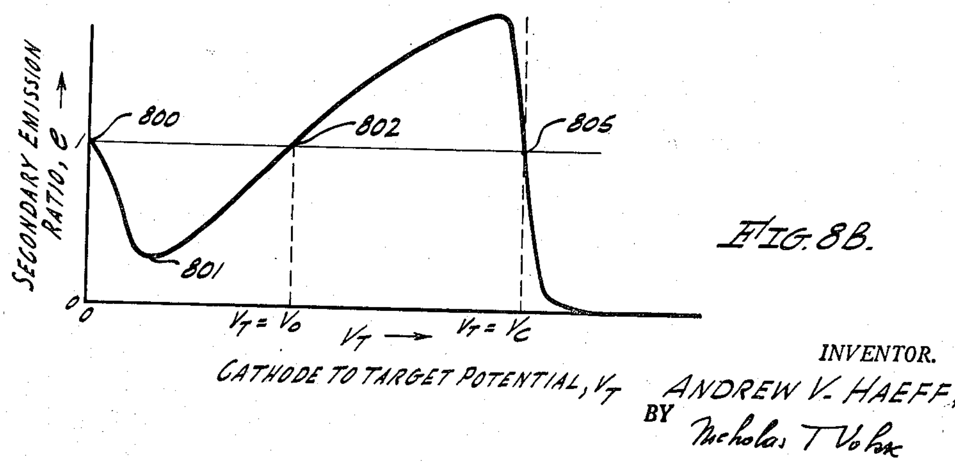
Fig. 8B is a plot of effective secondary emission ratio *e* versus cathode-to-target potential, $V_T$, when the potential $V_c$ of the collector grid is approximately equal to twice the critical potential, $V_0$.

In the case that the potential $V_c$, of the collector grid 702 is made approximately equal to $2V_o$, the electrons emitted by secondary emission will be attracted to the more positive element. Hence, when $V_T$ is just greater than the collector grid potential, $V_c$, there will be a very sharp line of demarcation, at which point the dielectric screen 703 will pick up all the incident primary electrons and attract the prospective secondary electrons resulting in the secondary emission ratio, $e$, being equal to zero. A plot of secondary emission ratio, $e$, versus cathode-to-dielectric screen potential, $V_T$, of this nature is illustrated in Fig. 8B. As exemplified by this curve, substantially no secondary emission electrons are produced in the region where the potential, $V_T$, is more positive than the potential of the collector grid 702.

Figure 9:
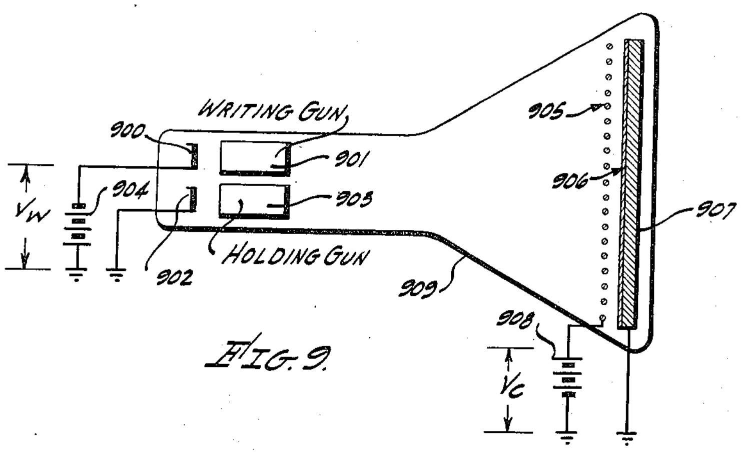
Fig. 9 illustrates a storage tube with writing gun, holding gun, collector grid and storage screen.

Consider now a hypothetical storage tube, as illustrated in Fig. 9, comprising a writing gun 901, a holding gun 903 and a collector grid 905 in front of a dielectric screen 906, all mounted in an evacuated envelope 909. A writing gun cathode 900 is maintained at a negative potential, $V_W$, with respect to ground, by a potential source 904. A holding gun cathode 902 is grounded. The collector grid 905 is maintained at a positive potential, $V_c$, with respect to ground, by a potential source 908. The dielectric screen 906 is made of a thin layer of nonconducting dielectric material deposited on a metallic plate 907 which is at an arbitrary fixed potential such as ground. Since dielectric screen 906 is made of a nonconducting dielectric material, it is necessary to consider the cathode-to-dielectric potential for each elemental area of the screen. For the purpose of defining the relative magnitudes of an "incremental element" of storage surface and an "elemental area" of storage surface, an incremental element of storage surface will mean a portion of the storage surface of the order of magnitude of the area subtended by the electron writing beam, and an elemental area will mean an area considerably smaller than an incremental element.

Figure 10:
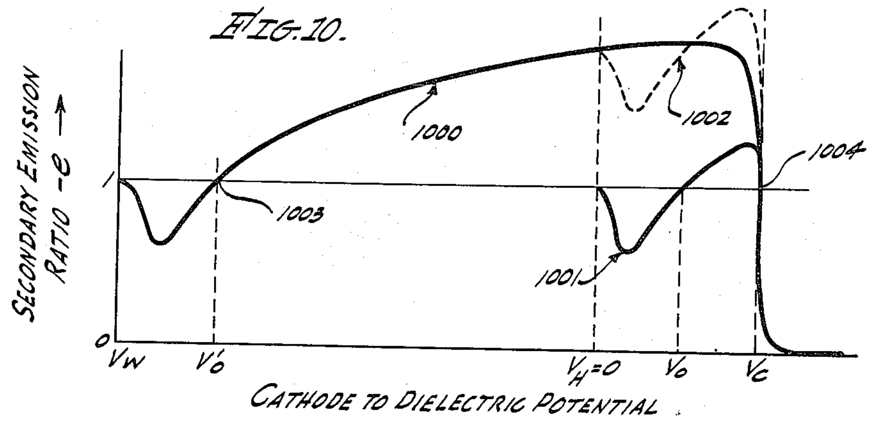
Fig. 10 illustrates characteristic curves of effective secondary emission ratio *e* versus cathode-to-storage screen potential for the tube illustrated in Fig. 9.

Therefore, for the hypothetical tube illustrated in Fig. 9, each elemental area will have secondary emission characteristics corresponding to the secondary electron emission phenomenon previously described. Representative curves of secondary emission ratio, $e$, versus the cathode-to-dielectric potential for the writing gun 901 and the holding gun 903 of Fig. 9 are illustrated in Fig. 10 where the potential, $V_W$, of writing gun cathode 900 is negative with respect to potential, $V_H$, of holding gun cathode 902. Referring to Fig. 10, curve 1000 represents the characteristic for the writing gun 901, curve 1001 the characteristic for the holding gun 903 and curve 1002 the composite characteristic for the simultaneous application of both the writing gun 901 and the holding gun 903. The electrons from the writing gun 901 are more concentrated than electrons from the holding gun 903, hence when a particular elemental area on screen 906 is bombarded simultaneously by electrons from both guns 901, 903 the effect of writing gun 901 predominates thus making the secondary emission ratio, $e$, greater than one in the region of operation from point 1003 to point 1004. Therefore the particular elemental area on dielectric screen 906 will sustain a loss of electrons to collector grid 905 and hence will acquire a positive potential.

Conversely, to cause an elemental area of dielectric screen 906 to decrease in potential, it is necessary that the initial potential of the elemental area be such that the secondary emission ratio, $e$, is less than one. In this case, fewer secondary electrons will be lost to the collector grid 905 than the number of primary electrons accumulating on the particular elemental area. To accomplish this, the potential, $V_W$, of the writing gun cathode should be negative with respect to the potential $V_c$ of the collector grid by an amount less than the critical potential $V'_o$ as indicated in Fig. 10.

From the above since the cathode 900 of the writing gun 901 is normally operated at a high negative potential, it follows that the writing gun 901 will produce some positive charge on every bombarded elemental area of dielectric screen 906, that is, every elemental area will be charged to some positive potential with respect to ground by means of the momentary application of the electron beam of writing gun 901. The continued action of the holding gun 903, after the exposure of the dielectric screen 906 to the writing gun 901, is to return all potentials less than the critical potential, $V_o$, to the potential of the holding gun cathode 902, and to change all potentials greater than the critical potential, $V_o$, to the potential, $V_c$, of the collector grid 905 as explained below. This can be easily understood by referring to Fig. 11 wherein an elemental area on the nonconducting dielectric screen 906 of the hypothetical tube of Fig. 9 has an initial arbitrary positive potential, $V_1$, which is less than the critical potential $V_o$, and corresponds to point 1100 on the secondary emission ratio versus cathode-to-dielectric potential curve. As seen from this curve for the holding gun 903, the potential $V_1$ is in a region where fewer secondary emission electrons are lost to the collector grid than incident primary electrons. Hence, the potential of such elemental area will get progressively more negative until a point 1102 is reached.

Similarly, if an elemental area of the nonconducting dielectric 906 of the tube of Fig. 9 has an initial arbitrary positive potential $V_2$, corresponding to point 1101, which is greater than the critical potential $V_o$, then more secondary emission electrons will be lost to collector grid 905 from this area than the number of the incident primary electrons, and the potential of such area will get progressively more and more positive, until a point 1103 is reached, where $V_2=V_c$. It should be noted that no elemental areas will be charged to a potential more positive than $V_c$, which is the potential of collector grid 905.

Figure 11:
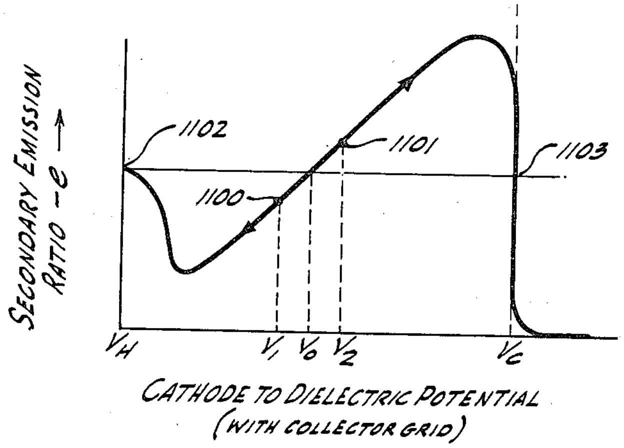
Fig. 11 illustrates the characteristic curve of effective secondary emission ratio *e* versus holding gun cathode-to-storage screen potential for the tube illustrated in Fig. 9.

Hence, under the action of holding gun 903, all the potentials on the nonconducting dielectric screen 906 will revert to potential $V_H$ or $V_c$, corresponding to points 1102 and 1103, respectively, on the secondary emission characteristic curve of Fig. 11. Depending on the dielectric properties and capacitance of the screen and the magnitude of the electron flow supplied by the holding gun 903, this action can be made to occur in a very short period of time which may be on the order of 10 to 100 microseconds. Furthermore, if the potential of collector grid 905 with respect to the potential of holding gun cathode 902 is approximately equal to $2V_o$, the potential distribution on screen 906 will remain indefinitely. By progressively reducing this potential difference $V_c-V_H$ (for example, to a value of approximately $1.3V_o$), the persistence can be progressively reduced to the order of magnitude of a few milliseconds.

Figure 12:
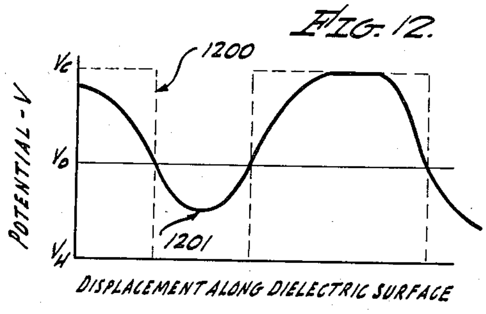
Fig. 12 shows the action of the holding gun in the tube illustrated in Fig. 9 in changing an arbitrary potential distribution on the surface of the dielectric potentials $V_c$ and $V_H$.

The potential distribution on the elemental areas of screen 906 is illustrated in Fig. 12 where curve 1201 represents an initial arbitrary potential variation produced by the writing gun 901 on dielectric 906 versus displacement along the dielectric surface 906. Due to the action of impinging electrons from holding gun 903 and the type of potential conversion illustrated in Fig. 11, the potentials represented by curve 1201 will be changed to potentials represented by curve 1200, all the potentials greater than $V_o$ being charged to the potential of collector grid 905, and all the potentials less than $V_o$ being charged negatively to the potential of holding gun cathode 902. The changeover from potential $V_c$ to potential $V_H$ takes place in a very small finite distance which is of the order of 0.1 mill or less, depending on the characteristics of the dielectric used. If the potential difference $V_c-V_H$ is approximately equal to $2V_o$, the potential distribution illustrated by the curve 1200 will remain unchanged indefinitely. However, if $V_c-V_H$ should be appreciably less than $2V_o$, the areas charged to potential $V_c$ will tend to attract electrons from the more negative areas which results in the positively charged areas growing progressively smaller until they are completely erased.

The functioning of the direct-viewing storage tube illustrated in Fig. 1 will now be described in the light of the phenomena described in connection with Figs. 8, 10, 11 and 12. As previously mentioned, the storage screen 26 comprises a metal mesh 84, the individual wires of which are coated on the back side with the dielectric material 204 as illustrated in Figs. 2, 3 and 4. The incident primary electrons of the writing beam, having high energy, will tend to deposit a positive charge on the bombarded storage surface of screen 26 due to the secondary emission ratio of the dielectric material 204, Fig. 2, being greater than unity; more specifically, the positive charge will be created on the bombarded portions of the dielectric surfaces 206 and 208 subtended by the beam of the writing gun 12. These positive charges influence the field at the surface of the metal mesh 84 in such a manner that when the charge is appreciable, the field is positive, and when the charge is low, the field is negative, as is explained more in detail below.

The time of exposure for each elemental area is held constant by having a constant sweep rate, but the amount of exposure of each elemental area is varied by varying the intensity of the electron beam of writing gun 12. Storage screen 26 behaves similarly to a photographic emulsion when the latter is exposed to light. This may be explained in the following manner.

Referring to Fig. 4, it can be seen that the capacitance of an elemental area of dielectric surfaces 206 and 208 to metal mesh 84 is approximately equal to $$\frac{\epsilon}{d}da$$

farads where $\epsilon$=dielectric constant of the material
$d$=distance of the elemental area from the surface of metal mesh 84, and
$da$=the actual area of the elemental area in square meters By way of example, an elemental area on the dielectric surface 208 which is closer to the exposed surface of metal wire 200 than an elemental area from surface 206 has a corresponding shorter distance to the metal surface and hence a capacitance that is correspondingly larger.

If the time of the exposure is held constant, the amount of the exposure will depend on the intensity of the electron beam. Upon exposure to the electron beam of writing gun 12, each elemental area will tend to be charged positively when the secondary emission ratio is greater than one, as previously explained in connection with Fig. 10, the extent of this tendency for each elemental area to be charged more positive depends on the extent of its exposure to the writing beam electrons and its capacitance to metal mesh 84. For example, the potential to which an elemental area will be charged is equal to the charge created on the elemental area divided by its capacitance to metal mesh 84. When the exposure time for each elemental area is constant, the charge deposited on an elemental area will be proportional to the current density of the electron beam of the writing gun 12. Hence, it follows that for equal exposures, the areas having a minimum capacitance will be charged to a higher potential than the potential for the areas having a larger capacitance.

After exposure to the electron beam of the writing gun 12, the impinging electrons from the holding gun 16 will raise all potentials on the dielectric greater than the critical potential, $V_o$, to the potential, $V_c$, of the collector grid (which, in this case, is the wire mesh 84 of storage screen 26) and decrease all potentials less than the critical potential, $V_o$, to the potential of the cathode of holding gun 16 in the manner described in connection with Fig. 11. It now follows that the portion of the total dielectric area which will be charged to potential $V_c$ will be proportional to the intensity of the electron beam from writing gun 12, the first portions being charged to potential $V_c$ being the areas having the least capacitance.

Referring to Fig. 4, it illustrates the cross-sectional view of a portion of the storage screen 26. Defining the surfaces 206 and 208 as the portions of the surface of dielectric 204 subtended by the writing gun 12, the regions of the surfaces 206 and 208 adjacent to the surface of metal wire 200 of metal mesh 84 have shorter electric field lines to said surface as compared to the more remote regions. Hence, the capacitance per elemental area of the dielectric surfaces 206 and 208 is larger for the regions nearer to the surface of wire 200 than for the regions farther out. For the purpose of future explanations, the low-capacity areas will be referred to as the outer regions and the high-capacity areas will be referred to as the inner regions.

To draw an analogy between any exposure of a photographic emulsion to light and an exposure of the varying capacitance screen 26 to the electron beam of writing gun 12, the outer regions will be charged to a higher positive potential than the inner regions, the variation in the capacitance of the two regions being comparable to the variation in the light sensitivity of different photographic emulsions. The subsequent continued action of holding gun 16 will convert all potentials less than the critical potential, $V_o$, to the potential, $V_H$, of its cathode and convert all potentials greater than the critical potential, $V_o$, to the potential, $V_c$, of the collector grid which in this case is the metal mesh 84. It follows then, that the more intense the exposure, the larger the portion of the surfaces 206 and 208 that will be charged to potential, $V_c$, the elemental areas in the outer regions having the least capacitance being charged first. As the total number of primary electrons reaching the surfaces 206—208 is increased by lengthening the time of exposure or by increasing the intensity of the writing beam, more area will be charged to a potential exceeding the critical potential, $V_o$, the last-remaining area being elemental areas in the inner region adjacent to the surface of metal wire 200.

From the above, it follows that exposure of the dielectric surfaces 206 and 208 to the electron beam of writing gun 12 will raise the dielectric surface to different positive potentials, the outer regions being more positive than the inner regions. The continued exposure of these regions to holding gun 16 will then change all potentials greater than the critical potential $V_o$, to the potential of metal mesh 84, and all potentials lower than the critical potential $V_o$, to $V_H$, the potential of the cathode of holding gun 16. There will be sharp lines of demarcation between negative and positive regions, the nearness of these lines of demarcation to the exposed surface of metal wire 200 of mesh 84 being a function of the amount of exposure. If the potential $V_c-V_H$ is less than $2V_o$, the negative regions will grow, eventually displacing the positive regions completely, the time required for this displacement being a function of the exact value of $V_c-V_H$.

A storage screen having the properties of the nature just described will be henceforth referred to as "varying capacitance storage screen," wherein each incremental element of said screen contains a plurality of elemental areas having different capacitance to a supporting metallic screen, the area of each incremental element being of the order of magnitude of the cross-sectional area of the writing beam. The word "varying," as used here, does not mean that the capacitance of any small elemental area varies continuously from one instant to another, but varies from point to point in proportion to the electrical distance to the metallic surface. Thus, the capacitance of one small elemental area differs from the capacitance of adjacent elemental areas when the elemental area has a different distance to the metal mesh 84 of the screen. In the case under discussion, the capacitance of any small elemental area on the surface of the dielectric layers 206 and 208 to metal mesh 84 is a function of the length of the electric field joining this elemental area to the metallic surface of metal mesh 84, and since the thickness of the layers 206—208 is different from point to point, as clearly illustrated in Fig. 4, especially at those portions of the dielectric layer 204 which are exposed to the action of the primary electrons, it follows that the capacitance of the elemental areas to metal mesh 84 on these particular surfaces of the dielectric will be non-uniform. For example, elemental areas which abut against the outer surface of conductor 200 will have maximum capacitance, and the elemental areas which are further removed from the surface of conductor 200 will have minimum capacitance. This non-uniform capacitance pattern is termed here as a varying capacitance storage screen, the word "varying" being used for the lack of a more accurate term being available for defining what is explained above.

Secondary electrons from the regions charged to a negative potential of the dielectric surfaces 206—208 are, for the most part, collected by the metal mesh 84 since they are not able to escape from the influence of the positive electrostatic field established by it. The secondary electrons from the positive regions of the dielectric are partly attracted by the positive electrostatic field of the viewing screen 28 penetrating through the interstices of storage screen 26 and partly by the field established by means of metal mesh 84. Bombardment of storage screen 26 by the primary electrons from holding gun 16 will also produce secondary electrons from metal mesh 84 which can escape to viewing screen 28 if the charge on dielectric surfaces 206 and 208 is predominantly positive, and which will be returned to metal mesh 84 if the charge on the dielectric surfaces 206 and 208 is predominantly negative. The paths of the returned secondary electrons are illustrated by dotted lines 408 and 412 of Fig. 4. The primary, as well as the secondary electrons, penetrating through the interstices of storage screen 26, will tend to pass through the meshes of the viewing screen 28 because it is maintained at a higher positive potential than that of the storage screen 26. However, as previously specified, the potential of contrast control grid 30 is adjusted to a value that is negative with respect to the potential of the metal mesh 84 of storage screen 26 and potential with respect to the potential of the cathode of the holding gun 16. Hence, the secondary electrons liberated from the metal mesh 84 of screen 26 and the secondary electrons liberated from the positive regions of the dielectric surfaces 206—208 are repelled by the contrast control grid 30 and returned to viewing screen 28. Examples of paths followed by secondary electrons of this type are indicated in Fig. 4 by the dotted lines 404, 406 and 410. The primary electrons from the electron guns, because of the more negative potential of their source, can penetrate the contrast control grid 30 to be subsequentially collected by collector electrode 32 which is maintained at a potential sufficiently more positive than grid 30 in order to suppress secondary emission from its conductive coating 36.

With the foregoing-described arrangement the signal impressed on intensity grid 41 of writing gun 12 will cause predominantly negative and predominantly positive regions to be created on storage surface 26 in accordance with the signal. The predominantly positive regions as compared to the predominantly negative regions of the storage surface 26 will permit a relatively greater number of the secondary electrons to penetrate through the interstices of storage screen 26 and through viewing screen 28 and be repelled by contrast control grid 30 to the phosphor coating of viewing screen 28 where they produce a visible image representative of the signal impressed on the intensity grid 41 of the writing gun 12.

The use of contrast control grid 30 makes it possible to obtain a better contrast because the primary electrons from the cathode of holding gun 16 may penetrate through the interstices of storage screen 26 and viewing screen 28 to be collected by collector electrode 32 instead of being repelled to viewing screen 28 along with the secondary emission electrons. The passage of primary electrons through the interstices of storage screen 26 is not controlled by the charge distribution thereon. Therefore the primary electrons carry no information and consequently should not be permitted to be repelled towards viewing screen 28 inasmuch as they would produce uniform illumination of the phosphor on screen 28 and thus reduce the contrast of the image produced by the secondary emission electrons on the viewing screen 28.

When it is desired to obtain an electrical output representative of the stored information, resistors 87, 88 or 89 can be placed in the leads connecting either the viewing screen 28, contrast control grid 30 or collector electrode 32 to their respective sources of potential with outputs at terminals 90, 91 or 92 since the beam current of reading gun 14, intercepted by these screens, will correspond, in certain ways, to the charge distribution on the storage screen 26. In particular, the electron beam of reading gun 14, when incident upon storage screen 26, will liberate more or less secondary electrons, depending upon whether the region bombarded by the beam is predominantly positive or predominantly negative, respectively. Therefore, the liberated secondary electrons after impinging on viewing screen 28 will produce a potential variation across resistor 87 in accordance with the stored information scanned by the electron beam of reading gun 14. In the case of the contrast control grid 30 and collector electrode 32, the percentage of incident primary electrons allowed to pass through the interstices of storage screen 26 will be greater for a predominantly negative region and less for a predominantly positive region. Thus a variation is produced in the number of primary electrons collected by contrast control grid 30 and collector electrode 32 resulting in a potential variation across resistors 88 and 89, respectively, in accordance with the stored information scanned by the electron beam of reading gun 14.

From the above description it is apparent that the described tube, then, can "store" the incoming signals on the surface of the storage screen 26 for an indefinitely long time when the potential difference $V_c—V_H$ is subsequently equal to $2V_o$ where $V_c$ is the potential of screen 26;

$V_H$ is the potential of the cathode 74 of the holding gun 16;

$V_o$ is the potential corresponding to unity secondary emission ratio for the dielectric material 204 used on screen 26.

For some material, such as phosphors P1 and P11, consisting of discrete particles of high dielectric strength and very high resistivity, the voltage range corresponding to very long persistence may be within the limits of $1.5V_o$ to $2.5V_o$ so that the adjustments are not critical.

The same tube can also "store" the incoming signals for a finite time which can be controlled by reducing the difference potential $V_c—V_H$ below the stable value. Additionally, this tube permits direct viewing of the charge distribution on storage screen 26 by observing the light output from the viewing screen 28 which is representative of the charge distribution. The tube also produces electrical output signals which correspond to the charge distribution on storage screen 26 and, hence, to the original input signals.

Figure 5:
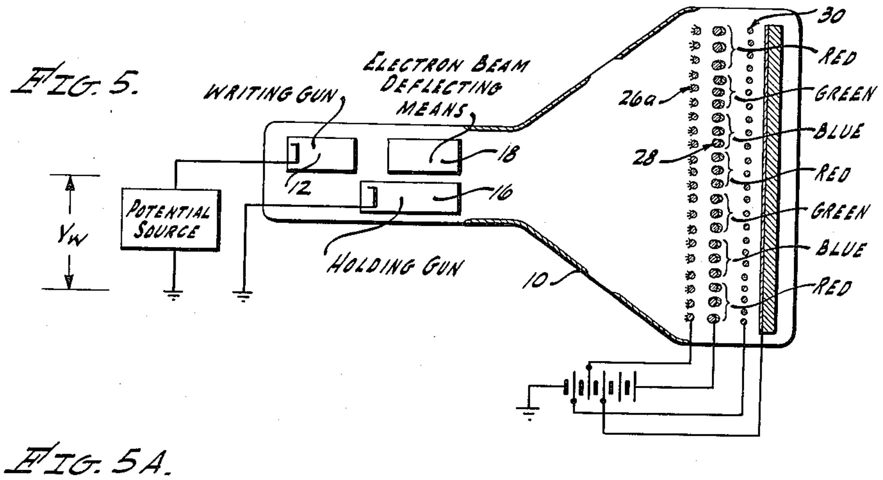
Fig. 5 illustrates a sectional schematic of an alternative embodiment of a direct-viewing color storage tube with dynamic range.

An alternate embodiment of the disclosed storage tube is illustrated in Fig. 5 where there is shown a direct viewing storage tube similar to that of Fig. 1 without a reading gun, except that a modified storage screen 26*a* is utilized, in order to achieve better control of fields in the vicinity of the secondary electron emitting surface. This is accomplished by fabricating storage screen 26*a* by spraying metal mesh 84 with random-sized dielectric particles, as shown in greater detail in Fig. 5A. The same type phosphor suspension previously used for storage screen 26 is applied with a spray gun from a considerable distance while drawing clean air through the mesh 84 to prevent the holes in the screen mesh from being clogged up. The metal mesh 84 is sprayed with the dielectric particles 550 until approximately 50% of its area facing the writing and reading guns is covered.

Figure 5A:
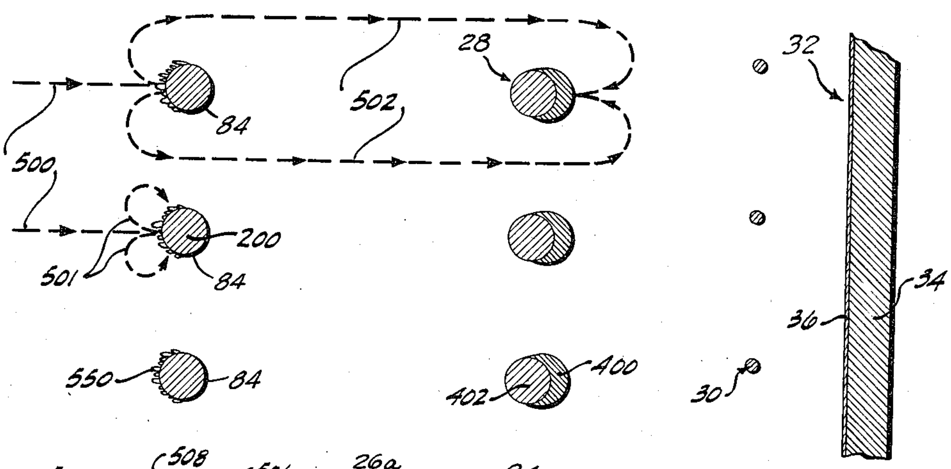
Fig. 5A is an enlarged functional diagram of the storage screen, viewing screen, contrast control grid, and collector electrode for the tube illustrated in Fig. 5.

As illustrated in Fig. 5A, the random-sized dielectric particles 550 are deposited on the metal mesh 84 which is identical in construction to the one similarly numbered in Fig. 1. The object of this process is to have each exposed elemental area on metal mesh 84 contain random-sized dielectric particles varying in size through a range determined by the type of sprayer used. Each dielectric particle, being different in size, has a different total capacitance to metal mesh 84 and hence is charged to a different potential by writing gun 12. The continued action of holding gun 16 then, will "fix" the potential on each particle, depending on whether or not the initial potential is above or below the critical potential $V_o$, at either $V_H$, the potential of the holding gun cathode or $V_c$, the potential of the collector grid which, in this case, is the metal mesh 84.

The potential of the individual phosphor particles then controls the field in the vicinity of the particle and determines whether the secondary electrons will be drawn away by the field of the viewing screen 28, or will be suppressed. The more a region of storage screen 26*a* is exposed to the action of the writing beam, the greater the number of dielectric particles that will be charged to a potential greater than $V_o$ and subsequently changed to potential $V_c$ by the action of holding gun 16. This increased exposure results in more secondary electrons being liberated by primary electrons from holding gun 16 impinging directly on the metal surface of metal mesh 84 and drawn away by the strong positive field of viewing screen 28. This function is illustrated in Fig. 5A wherein the paths of the incident primary electrons are shown by dotted lines 500, the paths of the secondary electrons escaping to the viewing screen 28 by two dotted lines 502, and the secondary electrons being suppressed by dotted lines 501. Of course, in order to achieve good contrast, the contrast control grid 30 should make proper selection between electrons originating at metal mesh 84 of storage screen 26*a* and all others, as previously described. Essentially the same operating potentials and principles of operation apply for this tube as were described for the tube illustrated in Fig. 1.

In many applications, it is desired to use color display presentation devices to convey additional information to the viewer. As one example, in a radar indicator, where range and azimuth is presented to the operator as an intensity pattern, color can be used to give information with regard to target elevation. For example, all targets above the horizon can be presented in one color, say red, and all targets below the horizon presented in green. In the past, means for doing this involved the use of separate storage devices and indicator tubes provided with means for presenting information from different areas of the storage devices in different colors. Utilization of the disclosed direct-viewing color storage tube will perform the function of both the storage and color display devices.

To obtain a colored picture or pattern, the phosphor 400 on the back side of viewing screen 28 may be applied in narrow stripes of different colors such as the primary colors red, green and blue, as indicated in Fig. 5. This, of course, would mean that each colored stripe of phosphor would be of sufficient width to be resolved by the focused electron beam of writing gun 12 and that the three different colored fields would be interlaced. For proper presentation, it is necessary that the scanning pattern of the writing beam correspond accurately to the pattern of color lines on the viewing screen. Since the storage screen 26 and viewing screen 28 are of fine mesh which the writing beam does not resolve, there is no problem of registration of the screens with respect to the colored phosphor stripes. This problem of adjustment of the scanning pattern to the color line pattern can be simplified by the use of automatic pattern correction circuits which can obtain correction signals from a system of "scan positioning electrodes" which can be placed alongside the viewing screen 28 and would be scanned by the writing beam. The "scan positioning electrodes" can be made in the form shown in Fig. 5C. For the rectangular pattern the main deflection can be accomplished in the usual manner using, for example, two pairs of electrostatic deflection plates. Assume that the main deflection system is initially aligned accurately with the line pattern. The deflection correction should be generated only in one direction, for example, if the lines are horizontal, the correction should be in the vertical direction. An auxiliary vertical deflection plate can then be used for correction purposes.

Figure 5B:
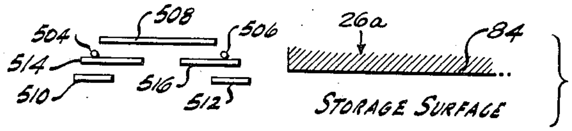
Fig. 5B illustrates a top view of the construction of the scan-positioning electrodes of the tube illustrated in Fig. 5.
Figure 5C:
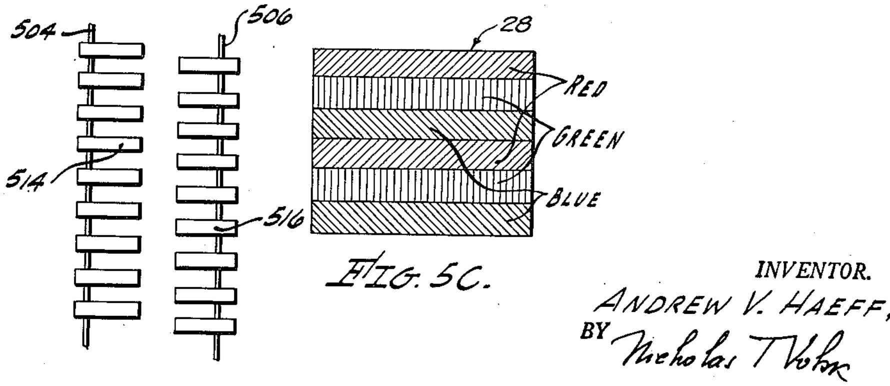
Fig. 5C illustrates a plan view of the construction of the scan-positioning electrodes of the tube illustrated in Fig. 5.

An arrangement of scan signal correction electrodes is shown in Fig. 5C wherein a system of two sets of horizontal wires 514 and 516 supported on side rods 504 and 506, respectively, are disposed in the same plane as the storage surface. Referring to the top view of the scan positioning electrodes, namely, Fig. 5B, a collector plate 508 and suppressor plates 510 and 512 are shown disposed in the back of and in the front of horizontal wires 514, 516, respectively, with respect to the electron guns. Potentials are applied to plates 508, 510 and 512 so as to prevent secondary emission from horizontal wires 514 and 516. These plates 508, 510 and 512 are placed behind and in front of the two sets of horizontal wires 514 and 516 so that when the writing beam scans along horizontal wires 514 and 516, the intercepted current will flow to leads 504 and 506. The width of each pair of horizontal wires is equal to the total width required for a phosphor stripe. Horizontal wires 514 and 516 are arranged alternately so that the lower side of one electrode on lead 504 is on the same horizontal plane as upper side of an electrode on lead 506. Each pair of horizontal wires have a common side in register with the center of a phosphor stripe. Hence, when scanned by the writing beam, unequal currents will flow dependent upon the amount and the direction of misalignment. These pulses of current can be amplified and smoothed and applied to the auxiliary vertical deflection plate to correct the vertical deflection. It should be noted that, in this particular case, correction potentials are derived regardless of the color field being scanned, but the error must be less than the width of one line.

Figure 5D:
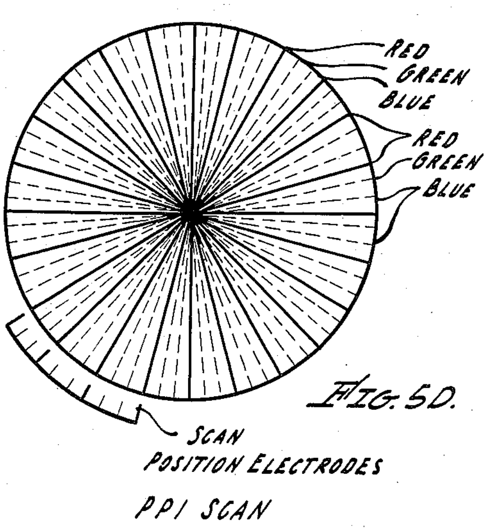
Fig. 5D shows a plan position indicator scan for the tube illustrated in Fig. 5.
Figure 5E:
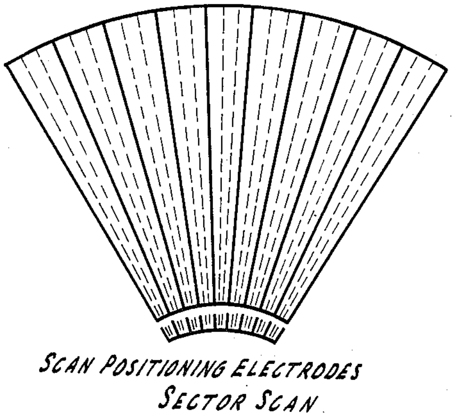
Fig. 5E shows a plan position sector scan for the tube illustrated in Fig. 5.

It may be desirable to have a scanning pattern different from the rectangular. For example, a P. P. I. or sector scan may be desired as illustrated in Fig. 5D and Fig. 5E. In these cases, a radial pattern of color stripes can be adapted to accommodate the P. P. I. or sector types of scan with the scan positioning electrodes placed along the outer edge of the P. P. I. scan, or along the inner edge of the sector scan.

An additional application of the storage tube of the present invention is for its use as a delay device such as is required, for example, for Moving Target Indication Systems. An embodiment of this type, illustrated in Fig. 6 may act as a delay line, thus replacing the memory or quartz delay lines now in use with the systems of this type. The advantage of using a storage tube of the type illustrated in Fig. 6, instead of the conventional delay lines, resides in the fact that the delay time may be selected or adjusted at any time, even after the tube is functioning as a delay element of a system. Moreover, while in the memory and quartz delay lines the attenuation of the signal to be delayed increases exponentially with an increase in the delay time, the attenuation of the signal, in the case of the storage tube, is independent of delay time. In these applications, use is made of the dynamic range to accurately reproduce the stored signal and to obtain any arbitrary delay time by using the ability of the device to store information in the form of electrical charges. Referring to Fig. 6, a storage tube capable of functioning as a delay device is shown. This tube comprises a writing gun 12, an electron beam deflecting means 18, a reading gun 14, an electron beam deflecting means 20, a collector grid 602, and a varying capacitance storage element 612, all enclosed in an evacuated glass envelope 10. Writing gun 12, electron beam deflecting means 18, reading gun 14, electron beam deflecting means 20, and holding gun 16 are similar in construction and operation to the corresponding units described in connection with the tube illustrated in Fig. 1.

In the operation of the tube illustrated in Fig. 6, collector grid 602 attracts secondary electrons emitted from storage element 612 by incident primary electrons and conducts them to ground through an output resistor 604. A conventional grid structure will suffice for the collector grid 602, the prime prerequisite being that it have a transparency on the order of 70%. The collector grid potential $V_c$ is applied to the collector grid 602 through resistor 604 which is connected to the positive terminal of potential source 606 the negative being connected to ground. The storage element 612, which is located behind collector grid 602 with respect to the electron guns, comprises a metal plate 608 on which shallow grooves 611 are machined or etched, so as to cover approximately 50% of the surface area. In order to obtain high resolution, the grooves are made very fine such as, for example, 200 to 300 grooves per inch may be used. These grooves extend horizontally completely across member 608, and appear in cross-section in Fig. 6. This cross-section, as viewed in Fig. 6, may be triangular in shape, or may assume the form of a semi-ellipse, a crescent, etc., so long as the depth of the groove first increases and then decreases in traversing the groove from one side to the other. In these grooves is deposited a dielectric material 610 such as P1 or P11 phosphor, or some other dielectric material such as silicon dioxide, in such a manner that any small region contains elemental areas having different capacitance to metal plate 608 because of the different depths of dielectric 610. Thus, storage element 612 constitutes a member similar to the varying capacitance storage screen 26 and **26*a*** previously defined in this specification.

The tube illustrated in Fig. 6 functions as follows. A charge distribution, corresponding to a signal to be delayed or stored, is deposited on storage screen 612 by electron beam of writing gun 12 is a manner similar to that previously described in connection with the tube illustrated in Fig. 1. The action of holding gun 16 then reverts all potentials on dielectric 610 to either the potential $V_c$ of grid 602 or to the potential $V_H$ of the cathode of the holding gun 16, depending on whether or not the initial potential was more or less than the critical potential, $V_o$. Furthermore, if the potential difference $V_c - V_H$ is made approximately equal to $2V_o$, the charge distribution deposited by the writing beam and fixed by electrons from the holding gun will remtain indefinitely on the dielectric 610. By momentarily reducing the potential on collector grid 602 such that the potential difference $V_c - V_H$ is less than the critical potential, $V_o$, all information stored on storage element 612 will be erased. No means for momentarily reducing potential $V_c$ is illustrated in Fig. 6 since such means is known in the art.

To read information stored on storage element 612, it is necessary to scan the region where the signal is stored with the reading beam. When an elemental area which has been charged predominantly positive, that is, mostly charged to the potential $V_c$, is scanned by the reading beam, the secondary electrons emitted from the metal plate 608 will be liberated and are subsequently attracted to collector grid 602. Conversely, when an elemental area, which has been charged predominantly negative is scanned by the reading beam, the secondary electrons emitted from the metal plate 608 will be suppressed with the result that collector grid 602 will pick up fewer secondary electrons. Hence, the potential across load resistor 604 will vary in accordance with the charge distribution scanned by the reading beam. The mode of operation for this tube is such that the storage screen 612 functions similarly to a photographic plate. Only the most intense signals of the writing beam charge every point on the dielectric in a particular region to a potential greater than the critical potential $V_o$. With less intense signals, that is, with less exposure, only that fraction of the dielectric which has low capacitance to plate 608 will be charged positive. Of course, with no exposure the dielectric remains negative. Since the effective secondary emission current from metal plate 608 due to the reading beam is controlled by the charge on the dielectric, the output current flowing through load resistor 604 will vary in proportion to the charge distribution stored on the elemental area of the target bombarded by the reading beam. Hence, the output signal voltage across resistor 604 will be proportional to the stored signals which, after any desired storage period or delay, can be reproduced faithfully in the output circuit. When the cathode of the reading gun is held at a potential approximately equal to $2V_o$ in the reading process, the stored signals are not erased by the reading beam and, therefore, the signals can be reproduced as many times as desired.

As stated previously, the effect of the electrons emanating from the holding gun 16 and reaching storage element 612 is to convert the original potentials deposited on the dielectric elements 610 by the electron beam of the writing gun to either the potential $V_H$ or $V_c$ in the manner discussed in connection with Fig. 12. It should be stressed here that this should not be construed to mean that the control exercised on the secondary electrons by the electric field established by the charge on dielectric elements 610 will be such that the output signals will have no dynamic range. On the contrary, dynamic range is obtained because storage element 612 functions similar to the varying capacitance screen 26 and **26*a* that is either smaller or greater areas of the surface of any given dielectric element 610 will be charged to the potential $V_H$ or $V_c$, depending upon the exposure of this element to the electron beam of the writing gun 12. When a relatively large area on the surface of the dielectric element 610, or the entire dielectric element 610, has the positive potential $V_c$, a larger number of the secondary electrons from the storage element 612 will reach grid 602 and vice versa, the number of the secondary electrons reaching collector grid 602 being a function of the relative proportion of the areas on the dielectric element 610 charged to the potential $V_c$ or $V_H$. Since the portion of positively charged area is a function of exposure to the electron writing beam, the portion of positively charged area produced by the beam for equal exposures thereto is a function of the intensity of the beam. Thus it follows that the signal appearing across resistor 604** will have an amplitude that corresponds to the input signal.

Figure 6A:
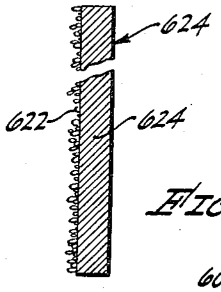
Fig. 6A shows an alternate storage screen for use in the tube illustrated in Fig. 6.
Figure 6:
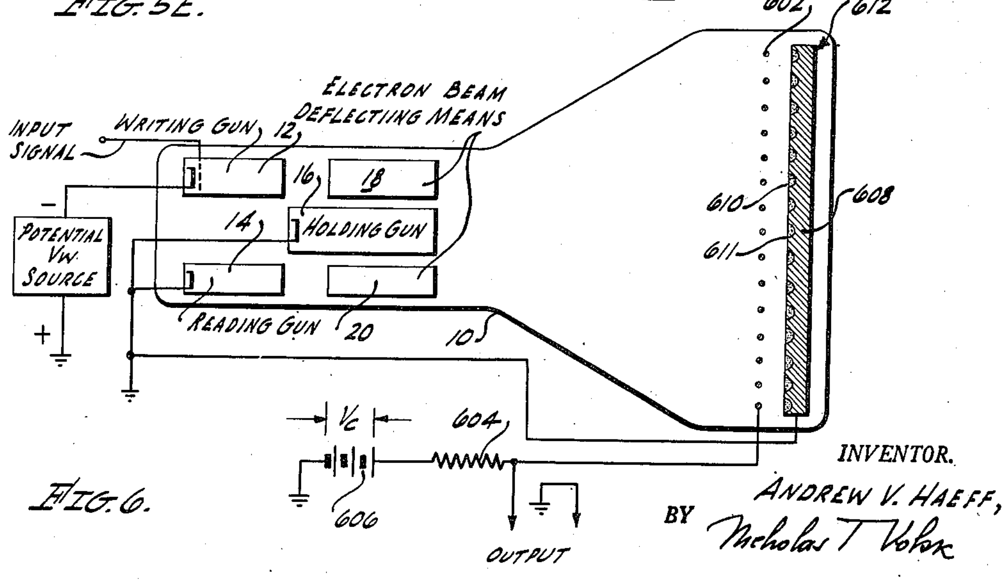
Fig. 6 illustrates a storage tube capable of producing an electrical output with dynamic range.

A storage element 624 similar to the storage element 612 is illustrated in Fig. 6A and may be fabricated in a manner similar to the storage screen 26a of Fig. 5. The storage element 624 is composed of a flat metal plate 620 on which is disposed random-sized dielectric particles 622 in a manner similar to that described for storage screen 26a. Because of the large range of capacitances of individual particles, the stored charge is proportional to exposure to the electron writing beam and the effective secondary emission resulting from scanning by the reading beam is proportional to stored charge and hence proportional to the original signal.

Figure 13:
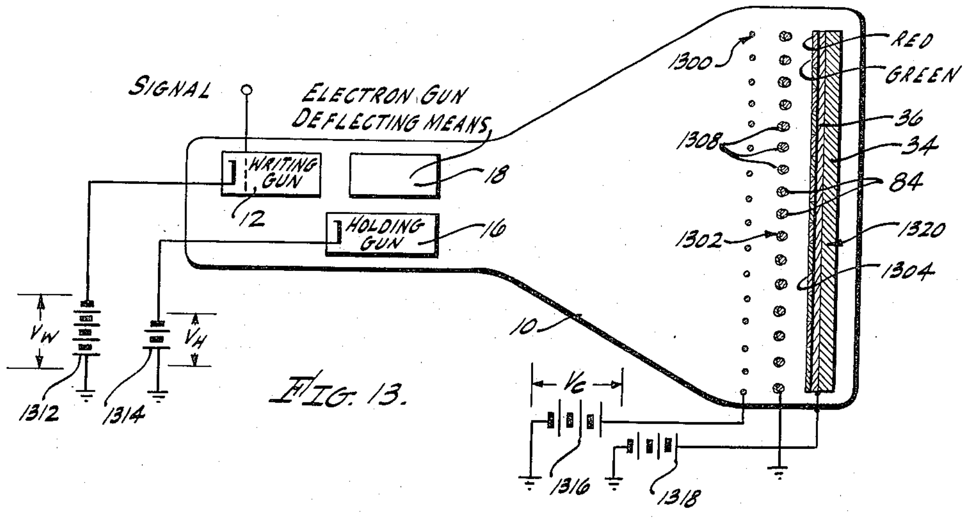
Fig. 13 illustrates an additional embodiment of the disclosed storage tube with color presentation.

A sectional view of an additional embodiment of direct-viewing color storage tube is illustrated in Fig. 13. The tube comprises a writing gun 12, an electron beam deflecting means 18, and a holding gun 16, all facing a collector grid 1300, a storage screen 1302 and a viewing screen 1320, all of which are enclosed in an evacuated glass envelope 10. The construction and operation of writing gun 12, deflecting means 18 and holding gun 16 is the same as the corresponding units described for the tube illustrated in Fig. 1. The collector grid 1300 may be a conventional grid structure with a preferable transparency on the order of 70% or more. The storage screen 1302 comprises a metal mesh, similar to the previously described metal mesh 84 used in storage screen 26 of the tube illustrated in Fig. 1, with a dielectric coating 1308 disposed (phosphor P1 or P11, etc.) on the side facing the electron guns. This dielectric coating is applied in a manner similar to that previously described for storage screen 26, i. e., by drawing clean air through the metal mesh 84 from the back side and spraying a suspension of phosphor particles and binder on the front side from a range of approximately 0.5 inch. In this case, the sprayer is kept perpendicular to the mesh at all times. The viewing screen 1320 comprises a glass plate 34 which is coated on the side exposed to the electron guns with a transparent conductive coating 36, such as "NESA," described previously. On top of coating 36 are desposited phosphor stripes 1304. The particular tube illustrated is designed for a radar display and uses only red and green stripes in order to give additional information and not necessarily to have the combined effect of reproducing a picture in color.

The cathode of writing gun 12 is maintained at a potential $V_W$ by means of a potential source 1312 which is of the order of −600 volts with respect to ground. A signal is applied to the intensity grid of writing gun 12, the quiescent potential of which is maintained at approximately 50 volts negative with respect to the cathode. Deflection means 18 is then made to deflect the electron writing beam so as to cause it to scan storage screen 1302 in synchronism with the signal impressed on the intensity grid. The collector grid 1300 is maintained at a potential $V_C$ by means of potential source 1316 and the cathode of holding gun 16 is maintained at a potential $V_H$ by means of potential source 1314. The potential difference $V_C-V_H$ is dependent on the desired persistency, being equal to about $2V_0$ for infinite time and progressively decreasing to approximately $1.3V_0$ for a persistency of a few milliseconds. The potential $V_0$, as previously mentioned, is the critical potential for the dielectric material used for phosphor coating 1308.

Metal mesh 84 of storage screen 1302 is connected to ground and conductive coating 36 of viewing screen 1320 is maintained at a high positive potential by means of potential source 1318 such that the electrons passing through the interstices of storage screen 1302 and impinging on the phosphor stripes 1304 will emit a desired amount of light. This potential may vary from 3000 to 10,000 volts or more, depending on the type and thickness of the phosphor stripes 1304.

Figure 14:
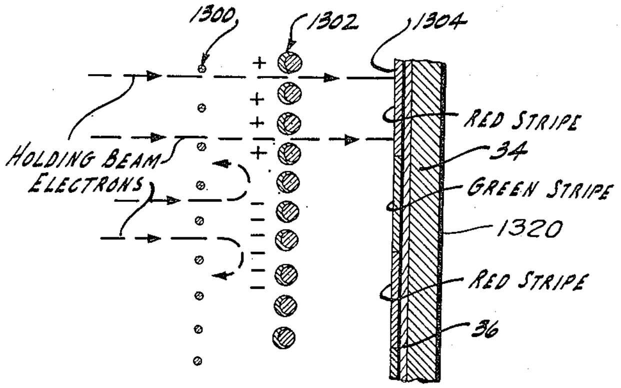
Fig. 14 is an enlarged functional diagram of the collector grid, storage screen and viewing screen for the tube illustrated in Fig. 13.

The functioning of the tube illustrated in Fig. 13 is as follows. Scanning of the writing beam over varying capacitance dielectric screen 1302 creates a charge distribution on the dielectric elements of screen 1302 corresponding to the incoming signals in the same manner described previously in connection with Fig. 1. At the same time the flood electrons from the flood or holding gun 16 are caused to continuously spray the entire surface area of storage screen 1302. The potential difference $V_C-V_H$ is adjusted to give the desired persistence. If the cathode potential $V_H$ of holding gun 16 is made positive with respect to metal mesh 84 supporting the dielectric storage material, then, as illustrated in Fig. 14, holding beam electrons arriving near the storage surface will be able to penetrate through the interstices of storage screen 1302 only in those regions where the potential on the storage surface is made positive by the writing beam. In the predominantly negative regions, the electrons are repelled back towards collector grid 1300. The electrons penetrating through storage screen 1302 are accelerated to high energy because of the positive potential impressed on the viewing screen 1320, and are made to impinge on its surface where the kinetic energy of the electrons is converted to light.

For two-color presentation, the viewing screen 1320 is made by disposing alternate stripes of red and green phosphor on conductive layer 36, the total number of such stripes being equal to the number of lines comprising the raster. If the scanning pattern is energized in such a manner that "red" signals are recorded on storage screen 1302 along a line in register with a red stripe on the viewing screen 1320. The continuous bombardment by holding beam electrons then results in the "red" signals appearing red on the viewing screen. Similarly, the "green" signals are recorded along lines in register with the green lines of the viewing screen 1320. Therefore, it is seen that the described direct viewing storage tube of the present invention presents and makes visible continuously both the red and green signals simultaneously.

Figure 15:
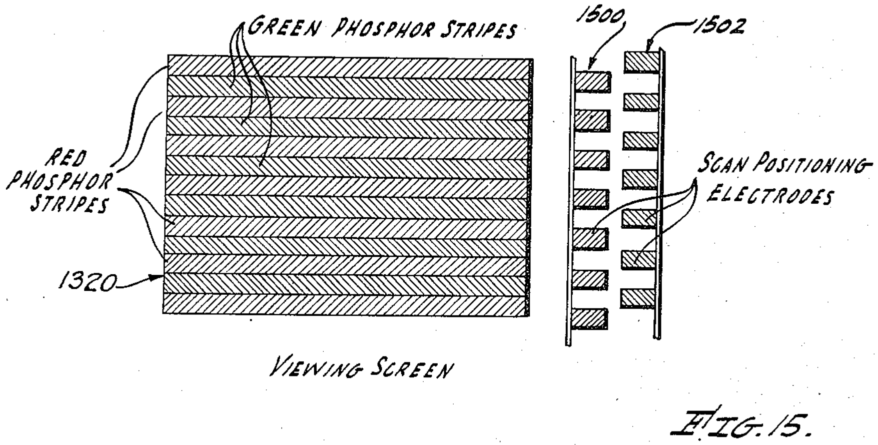
Fig. 15 is a plan view of the colored phosphor stripes showing the relative position of the scan-positioning electrodes.

For proper presentation of signals in correct colors, it is necessary that the scanning pattern of the writing beam correspond accurately to the pattern of color lines on the viewing screen. Since the writing beam does not resolve the fine mesh screens of the storage screen 1302 and collector grid 1300, there is no problem of registration of the collector grid 1300 and storage screen 1302 with respect to viewing screen 1320. The problem of adjustment of the raster to coincide with the color line pattern can be, as previously described for the tube illustrated in Fig. 5, simplified by the use of automatic pattern correction circuits which can obtain correction signals from a system of "scan-positioning electrodes" as illustrated in Fig. 15.

A system of scan-positioning electrodes 1500 and 1502 is constructed having electrodes spaced with a periodicity equal to the width of two phosphor stripes, the width of each individual electrode being equal to the width of one phosphor stripe. The positioning electrodes 1500 are then placed so that the center line of each electrode is in register with a line dividing the phosphor stripes. The positioning electrodes 1502 are then disposed to the right of electrodes 1500 as viewed in Fig. 15 in such a manner that the electrodes 1500 are opposite the spaces between electrodes 1502 the horizontal edges of alternate electrodes being on a horizontal straight line. An auxiliary vertical deflection plate is used in the deflecting means 18 for correcting the vertical deflection of the writing beam. As the writing beam scans the positioning electrodes in register with the center of a phosphor stripe, the current pulses intercepted by positioning electrodes 1500 and 1502 will be equal. If the writing beam is not centered, the current pulses intercepted by the electrodes 1500, 1502 will be of different magnitudes. This difference can be amplified and impressed on the auxiliary vertical deflection plate to correct the vertical deflection of the writing beam. It should be noted that polarity of the correcting signal will be different for each color and hence, suitable switching between fields should be incorporated in the circuit so as to apply a signal having the appropriate polarity to the auxiliary deflection plate. The advantage of this arrangement over the previous system of scan-positioning electrodes described in connection with the tube illustrated in Fig. 5 is that only half the number of horizontal electrodes are required. The scan-positioning electrodes 1500 and 1502 should be mounted flush with the storage screen 1302 and not flush with the viewing screen 1320 in order to avoid difficulties with parallax of the writing beam due to the angle of incidence of the writing beam being other than perpendicular to storage screen 1302, and to different distances of the storage screen 1302 and viewing screen 1320 from writing gun 12.

One of the advantages of the storage tubes of the present invention, particularly when used to present a colored image, is the absence of flicker due to the fact that all the colors are illuminated continuously and simultaneously. The writing beam, modulated by the incoming signals to be presented, simply charge elemental areas of the storage screen which function as "control grids," to control the flow of electrons from the holding gun through the interstices of that elemental area of the storage screen towards the viewing screen.

What is claimed as new is:

1. An electronic device for storing electrical signals in the form of an electrostatic field pattern, said device comprising: an evacuated envelope; a varying capacitance storage screen mounted within said envelope, said storage screen including an electrically conductive element for providing a support surface and a plurality of nonconductive incremental elements of secondary electron emissive dielectric material disposed uniformly over a substantial portion of said support surface wherein the distance from different portions of the exposed surface of the incremental elements within each elemental area of said storage screen to said support surface varies between predetermined limits; an electron gun mounted within said envelope for producing an electron beam, said gun including means responsive to the electrical signals to be stored for continuously modulating the intensity of said electron beam in accordance with the electrical signals; and electrical scanning means for deflecting said beam over said screen to charge each scanned portion of surface of said incremental elements to a potential proportional to the intensity of said beam at the instant said beam is incident on said scanned portion of surface and to the distance from said scanned portion of surface to said support surface.

2. The device defined in claim 1, which further includes means for flooding said screen with electrons emanating from a source maintained at a first potential level to charge said scanned portions of surface of said incremental elements at potentials less than the critical potential of said dielectric material to said first potential level and to charge the remaining portions at potentials greater than said critical potential to a second potential level greater than said critical potential.

3. The device defined in claim 1, wherein said electrically conductive element is a metallic mesh and said plurality of incremental elements of dielectric material are disposed uniformly over the side of said mesh farthest from said electron gun and overhang the interstices of said mesh whereby the distance between said mesh and portions of the surface of said dielectric material exposed to the other side thereof varies between predetermined limits.

4. An electronic storage tube comprising a storage screen including an electrically conductive member to provide a support surface, and a plurality of incremental elements of nonconductive secondary electron emissive dielectric material disposed over a substantial portion of said support surface, the thickness of dielectric material between different portions of the exposed surface of said deposits and said support surface within each elemental area of said storage screen being between predetermined limits; means for producing first and second electron beams; means for modulating said first electron beam with an image signal; means for collecting secondary electrons from said storage screen at a first potential level; means for scanning said storage screen with said first electron beam to charge said different portions of each elemental area of said screen to voltages proportional to the intensity of said beam and said thickness of dielectric material; means for uniformly flooding said storage screen with electrons emanating from a second potential level to change the charge on said different portions of each elemental area initially at a potential less than the critical potential of said dielectric material to said second potential level and to change the charge on said different portions of each elemental area initially at a potential greater than said critical potential to said first potential level whereby the composite potential on an elemental area of said storage screen is representative of the intensity of said first beam at the instant said first beam was incident on said elemental area; and means for scanning said storage screen with said second electron beam to release secondary electrons from each scanned elemental area thereof in proportion to the composite potential on said scanned elemental area.

5. An electronic storage tube comprising a storage screen including an electrically conductive member and a plurality of incremental elements of dielectric material on said member, wherein the thickness of each of said incremental elements between different portions of the surface thereof and said conductive member varies between predetermined limits; means for producing an electron beam; means for modulating said electron beam with an image signal; means including said electron beam for producing a composite potential corresponding to said image signal on each elemental area of said storage screen, means for directing flood electrons uniformly over said storage screen to liberate secondary electrons from each elemental area thereof in proportion to the composite potential thereon whereby numerous primary electrons penetrate through the interstices of said storage screen; a foraminous viewing screen disposed coextensive with and adjacent to said storage screen; means for directing said liberated secondary electrons together with said numerous primary electrons in a collimated beam through the interstices of said storage mesh in proportion to the charge thereon and through the foramina of said viewing screen; and means for repelling only said liberated secondary electrons back towards said viewing screen to produce a visual presentation of said image.

6. An electronic storage tube comprising a storage screen including a metallic mesh, and a layer of nonconducting secondary electron emissive dielectric material on one side of said mesh and overhanging the interstices thereof whereby the thickness of the portions of said layer exposed to the other side of said mesh progressively increases with the distance from the line of demarcation between said layer and said mesh thereby providing a variable capacitance storage surface; means for collecting secondary electrons at a first potential level from said storage surface; means for producing an electron beam; means for modulating said electron beam with an image signal; means for scanning said storage surface with said modulated electron beam to charge each portion of said storage surface within each scanned elemental area of said storage screen to a potential proportional to the capacitance of said portion of storage surface to said metallic mesh and to the intensity of said beam when incident on said elemental area; means for directing flood electrons emanating from a second potential level uniformly over said storage screen to change the charge on said portions of storage surface initially at potentials less than the critical potential of said dielectric material to said second potential level, to change the charge on said portions of storage surface initially at potentials greater than said critical potential to said first potential level, and to liberate secondary electrons from said metallic mesh within each elemental area of said storage screen in proportion to the potential level predominating therein; and means responsive to said liberated secondary electrons for producing a visual presentation of said image signal.

7. The electronic storage tube as defined in claim 6 wherein said means responsive to said liberated secondary electrons for producing a visual presentation of said image signal comprise a foraminous viewing screen disposed adjacent to and coextensive with said storage screen, means for directing said liberated secondary electrons along with a portion of said flood electrons in a collimated beam through said viewing screen, means for repelling said liberated secondary electrons towards said viewing screen, and a transparent conductive electrode disposed to intercept and collect said portion of said flood electrons.

References Cited in the file of this patent

UNITED STATES PATENTS

| | | |
|---|---|---|
| 2,156,435 | Schroter et al. | May 2, 1939 |
| 2,257,942 | Farnsworth | Oct. 7, 1941 |
| 2,259,507 | Iams | Oct. 21, 1941 |
| 2,532,339 | Schlesinger | Dec. 5, 1950 |
| 2,547,638 | Gardner | Apr. 3, 1951 |
| 2,604,606 | Rajchman | July 22, 1952 |
| 2,661,442 | Buckbee | Dec. 1, 1953 |